July 28, 1964 H. LINDEMANN 3,142,228
METHOD AND MACHINE FOR SCALPING METAL ROD STOCK
Filed Oct. 24, 1960 3 Sheets-Sheet 1

INVENTOR
HANS LINDEMANN
BY Dicke, Craig & Freudenberg
ATTORNEYS

July 28, 1964 H. LINDEMANN 3,142,228
METHOD AND MACHINE FOR SCALPING METAL ROD STOCK
Filed Oct. 24, 1960 3 Sheets-Sheet 2

INVENTOR
HANS LINDEMANN
ATTORNEYS

July 28, 1964   H. LINDEMANN   3,142,228
METHOD AND MACHINE FOR SCALPING METAL ROD STOCK
Filed Oct. 24, 1960   3 Sheets-Sheet 3

INVENTOR
HANS LINDEMANN
BY Dicke, Craig & Freudenberg
ATTORNEYS

United States Patent Office 3,142,228
Patented July 28, 1964

3,142,228
METHOD AND MACHINE FOR SCALPING METAL ROD STOCK
Hans Lindemann, Bielefeld, Germany, assignor to Th. Calow & Co., Bielefeld, Germany
Filed Oct. 24, 1960, Ser. No. 64,508
Claims priority, application Germany Nov. 2, 1959
6 Claims. (Cl. 90—24)

The present invention relates to a method and to an apparatus for reducing the cross-sectional size of rod stock and other elongated workpieces by a cutting operation, usually called "scalping" or "skimming."

It is already well known that the cross-sectional size of rod stock and similar elongated workpieces may be reduced by drawing them through a drawing or cutting die or by turning them, for example, in a lathe, or by passing them in a nonrotatable position through a revolving cutterhead so as to "scalp" or "skim" a surface layer off the workpiece. The reduction of the cross-sectional size by drawing the material through a drawing die generally requires that previously thereto the decarburized layer which is necessarily produced by the rolling operation, as well as slag inclusions or the like will be removed in a manner as known in the surface treatment of easily machinable materials, for example, by scalping or by drawing the stock through a stationary cutting die.

Although the maximum cutting speed and feeding speed attainable in turning or scalping operations on materials which are difficult to machine have in recent years been considerably increased, it has not been possible to exceed certain limits in reducing the cross-sectional size of such materials. If, for example, in scalping machines which presently are operated with a driving power of 100 to 300 H.P. (while scalping machines for special purposes are even driven with a power of 1000 to 5000 H.P.), the output is to be increased, for example, ten times, this may be attained by increasing the feeding speed per revolution, or by increasing the cutting speed without increasing the feeding speed, or by increasing both the feeding and cutting speeds. An increase of the feeding speed is, however, limited by the desired degree of accuracy of the finished products. Thus, although it may still be admissible at the present time to machine rods of a diameter of, for example, 10 mm. at a feeding speed of 10 mm. per revolution, it is impossible to machine a bar of a diameter of 100 mm. with sufficient accuracy at a feeding speed of 100 mm. per revolution.

The cutting speed is generally limited, first, although not decisively, by the cutting tool, second, by the manner of mounting the rotary cutterhead, and third, by the driving power.

One of the greatest difficulties which arise when the cutting speed is increased consists in the high bearing speeds which then occur. It is then no longer possible to mount the cutterhead in bearings, unless a procedure is applied as proposed for skimming wire stock, namely, to use the wire as a bearing element and to move it in a vertical direction, while the cutter-head is supported by compressed air.

The difficulties become even worse if both the cutting speed and the feeding speed are increased. This means in effect that the difficulties increase out of all proportion if the output of scalping or skimming machines, particularly in material which is difficult to machine, for example, steel, is to be increased considerably.

It is an object of the invention to provide a method which permits the output of such machine tools, particularly scalping machines, to be considerably increased over the output which has been previously attainable.

This method is based upon the presumption that the output of such a machine can be increased considerably only if the material to be machined is passed at a relatively high speed through the cutting tools. The most suitable method of doing so appeared to be to ram the workpiece through the cutting tool or tools in a manner similar to the method known in machining short workpieces, such as bolts, of easily machinable materials in which the workpieces are driven through a stationary die. In order to machine materials which are difficult to cut by ramming them through a cutting die it is, however, absolutely required that the workpiece as well as the feeding means thereof will be guided so as to prevent them from buckling. This can be done without great difficulties, for example, if both in front of and behind the cutting means, as seen in the direction of movement of the workpiece, substantially stationary, resilient, centering guiding means, such as spring-loaded collets or the like, are provided which are spaced from each other at a distance which is smaller than the buckling length of the workpiece through the cutting tool. Of course, the workpiece may also be additionally drawn through the cutting tool, or the workpiece may be mounted in a stationary position while the tool, that is, the cutting die, is moved.

It has, however, so far not been possible to insure absolutely that a workpiece which consists of a material which is difficult to machine and which is forced against one or more cutting tools will actually be cut. When such a workpiece consisting, for example, of steel is to be rammed through a stationary, that is, nonrotatable tool such as a cutting die, this movement will be opposed by a very great resistance. Marginal stresses will then occur which often prevent even the removal of only an annular surface layer of a very small wall thickness, and after moving only a small distance into a stationary cutting die, a workpiece of a material which is hard to cut will often remain stuck in the die. As a matter of fact, it is often easier to destroy the cutting die than to ram the workpiece therethrough.

If the workpiece consists, however, of a material which is easily machinable, for example, of copper, and if only a relatively thin annular layer, the oxide layer, is to be removed, as it is done, for example, on copper wires or copper rods, the difficulties as mentioned above do not arise, and such copper wires or copper rods are therefore frequently drawn through cutting dies in order to reduce their diameter by a small amount.

The above discussion shows not only that there is very little sense in attempting to pass workpieces which are hard to cut through stationary cutting dies in order to reduce their cross-sectional size, but it also shows that it is practically impossible to use such cutting dies if the output of the machine is to be even further increased.

According to the present invention it has, however, been found that such cutting dies, even though they may be of a more or less conventional type, may also be used for machining workpieces of materials which are hard to cut if the rod stock, prior to being moved through a cutting die which has a minimum diameter corresponding to the final desired diameter of the workpiece, is machined in such a manner that the layer to be removed will have at several points such a small wall thickness that the remaining part of the layer which has to be severed by the cutting die will tear at these points. In other words, according to the method of the invention, the cutting output depends almost entirely upon the speed at which the workpiece will be rammed through the cutting die. Obviously, this also requires that the driving power of such a machine be increased over the power which is usually required in similar machines, such as scalping or skimming machines or the like.

According to the invention, it is therefore advisable to provide the rod stock or the like before it is passed through a cutterhead, which may consist of one or more parts and has a minimum inner diameter corresponding to the desired final diameter of the workpiece, with a plurality of grooves or the like which extend in the longitudinal direction of the workpiece. These grooves are preferably made of such a depth that only a very small wall thickness remains between the bottom of each groove and the final desired surface of the rod stock. These grooves or the like may be produced either by a preliminary cutting operation, for example, by shaping or by passing the rod stock or the like through a cutting die which is provided with several cutting edges, or by rolling the grooves longitudinally into the stock. Whether the production of the grooves and the subsequent scalping or skimming of the remaining layer which is to be removed is to be carried out by a single continuous operation or by two separate but successive operations is merely a question of the required driving power. Usually, however, it will be more advisable to carry out the two operations by two separate procedures in order to be able to make the feeding speed of the grooved stock for the cutting operation according to the invention as high as possible.

It has already previously been mentioned that the cutting die which is used in accordance with the inventive method to determine the final diameter of the workpiece may consist either of one or several parts. This cutting die may, however, also be provided with one or several cutting edges, although usually it will be advisable—especially for reasons of an easier manufacture—to use an annular die with only one cutting edge. This, however, does not exclude the possibility that such an annular die may be provided with several cutting blades which together form a single, at least theoretically continuous cutting edge. Depending upon the material to be machined, the cutting die or the cutting tools of such a die may be made of high-speed steel, of cemented carbide, or of similar materials. Regardless of the type of material of which the cutting die or the cutting tools are made, it is advisable to provide the die or tools at a point underneathe and behind the cutting edge with a surface of a small width which has a clearance angle of 0°, as is already known as such in cutting tools of revolving cutterheads of scalping or skimming machines.

If the above-mentioned procedures are applied, the workpiece will no longer be primarily affected as in a conventional scalping machine by bending and rotary vibrations, but by longitudinal vibrations since the principal exciters of occurring vibrations act in the longitudinal direction of the material to be machined. In accordance with this finding, it is another feature of the invention to provide a machine for carrying out the inventive method which has at least one cutting die or the like and in which the material to be machined is provided immediately in front of and behind the cutterhead with at least one substantially stationary, centering guide element, for example, a resilient collet or the like which exerts a damping effect upon all of the vibrations which may occur in the workpiece, and to provide such a machine with suitable means which will ram the workpiece through the cutting tool and will increase the natural frequency of the workpiece so as to counteract the longitudinal vibrations thereof. The means for moving the workpiece may consist of a bar which is adapted to be reciprocated and is guided so as to prevent it from buckling. The means for increasing the natural frequency of the rod stock to be machined may consist of several substantially stationary guide elements which are mounted in a spaced relation to each other both in front of and behind the workpiece and exert a pressure thereon. Those guide elements which are mounted in front of the cutting die and at least some of the guide elements which are mounted behind the cutting die should be provided with guide means such as jaws, rollers, or the like which are resiliently yieldable, for example, against the action of springs, in directions which extend transverse to the longitudinal axis of the workpiece, and which exert a vibration-damping action in these directions. In place of the first guide element behind the cutting die, it is also possible to provide a drawing die of a conventional type. If several drawing dies are provided behind the cutting die, they will act like work-centering guide means and form nodal points to counter-act longitudinal vibrations, inasmuch as the workpiece has then already been machined. The distance between the adjacent guide elements which engage with the workpiece should be smaller than the buckling length of the workpiece and should preferably amount to a fraction of the buckling length. Such a guide element, for example, in the form of a resilient collet or the like, may thus be mounted, for example, at every 30 cm. Although each of these guide elements has a natural frequency, they will all exert a clamping action upon the workpiece which counteracts the vibrations thereof. The important point to be observed is merely that in order to counteract the longitudinal vibrations, the natural frequency of such a guide element is smaller than the natural frequency of a bar to be machined. For damping the vibrations as much as possible, the guide elements should surround the workpiece as completely as possible from all sides and should therefore be as annular as possible. If the natural frequency of a resilient guide element is relatively high, the individual guiding parts thereof should be acted upon by damping means. The collets or the like forming the resilient guide elements have the quality that they are not affected at all by high frequencies. Such a guide element therefore not only suppresses rotary vibrations—a quality which has already been utilized in scalping machines with a revolving cutterhead through which the rod stock was passed while secured in a nonrotary position—but it also suppresses longitudinal vibrations since at each point where such a guide element is provided, no vibration loop can form. Resilient guide elements regardless of what type of construction they might be therefore act upon the bar stock before or after it is machined in the same manner as a pipe which is slipped over a rod so as to surround the rod with a very small play. Any longitudinal vibrations which are produced in the rod can then no longer exert themselves. This is also the reason why resilient guide elements which surround a workpiece like a ring exert a better vibration-damping action than rollers which are pressed by springs upon the workpiece and center the same.

A further possibility of moving the workpiece through the cutting die and of increasing its natural frequency during the machining in order to counteract longitudinal vibrations consists according to another feature of the invention in designing the means for moving the workpiece in the form of a reciprocating slide carriage on which several clamping means are mounted in a spaced relation to each other. These clamping means which are provided in the form of adjustable chucking devices are adapted to center and grip workpieces of different diameters so that the axes of these workpieces will always coincide with the axis of the cutting die. Furthermore, these clamping means are provided with control means which are operated in accordance with the feeding speed of the workpiece so as to open the clamping means when they are moved by the slide carriage to a point closely in front of the cutting tools and to close the clamping means again shortly after they have passed the cutting tools. It is further advisable to provide the slide carriage with at least one weight member which is slidable relative to the carriage and is acted upon by at least one spring. This weight member has primarily the purpose of damping the longitudinal vibrations of the carriage.

Also in this embodiment of the invention the distance between the adjacent clamping means which engage with the workpiece should be made smaller than the buckling length of the workpiece and should preferably amount to a fraction of the buckling length. This distance may also in this case amount, for example, to 30 cm. Each of these individual clamping means should have two clamping jaws, one of which is slidable in a straight direction and is provided with two plane clamping surfaces which extend symmetrically to the feeding direction of this jaw and together form a V-shape, while the other clamping jaw has a plane surface extending at a right angle to the feeding direction of the first clamping jaw. This second clamping jaw should further have a gliding surface which extends at an oblique angle to the feeding direction of the first clamping jaw. By means of this gliding surface, the second jaw is slidable along a corresponding stationary surface under the action of a spring which tends to move this jaw toward the first jaw. In the clamping position a straight contact surface on the second jaw which is provided opposite to the gliding surface thereof and extends at an acute angle thereto will engage with a corresponding surface on a projecting part of the first clamping jaw. The first clamping jaw is then adapted to be moved back and forth by suitable means which may be operated either mechanically, hydraulically, electrically, magnetically, or in any other suitable manner.

The above-mentioned and further objects, features, and advantages of the present invention will become more clearly apparent from the following detailed description thereof, particularly when read with reference to the accompanying drawings, in which—

FIGURE 7 shows a side view of a machine which is provided with a slide carriage carrying a plurality of checking devices; while

Figure 1:
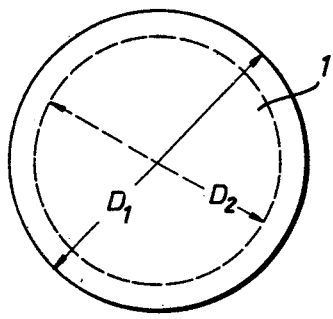
FIGURE 1 shows an end view of a bar which consists of a material which is hard to cut and the diameter of which is to be reduced from a value $D_1$ to the value $D_2$.
Figure 2:
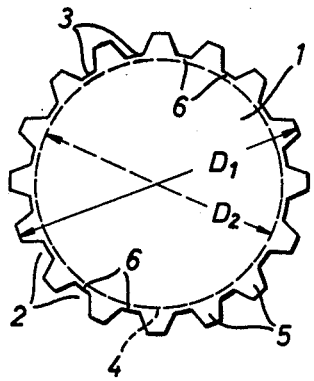
FIGURE 2 shows an end view of the bar according to FIGURE 1 after it has been provided with longitudinal grooves or the like in the peripheral surface thereof.

Assuming first with reference to FIGURES 1 and 2 that the outer diameter $D_1$ of the bar 1 which consists of a material which is hard to cut is to be reduced to a diameter $D_2$, the present invention provides that the bar is first provided with longitudinal grooves 2 or the like within the outer peripheral surface of the bar. These grooves 2 should be made of a depth so that the bottom surface 3 of each groove is still spaced at a small radial distance from the peripheral surface 4 which is to be finally attained, that is, a surface which has the mentioned diameter $D_2$. The grooved bar 1 is then passed, preferably rammed, through a die 7 of high-speed steel, as shown in FIGURE 3, or through a die 8 of cemented carbide, as shown in FIGURE 4, whereby the outer grooved shell which has a maximum thickness corresponding to the difference between the diameters $D_1$ and $D_2$ may be severed from bar 1 since the shell will be easily torn at the points 6 between the adjacent remaining webs 5, permitting these webs to be cut and to be "peeled" outwardly by die 7 or 8.

Figure 3:
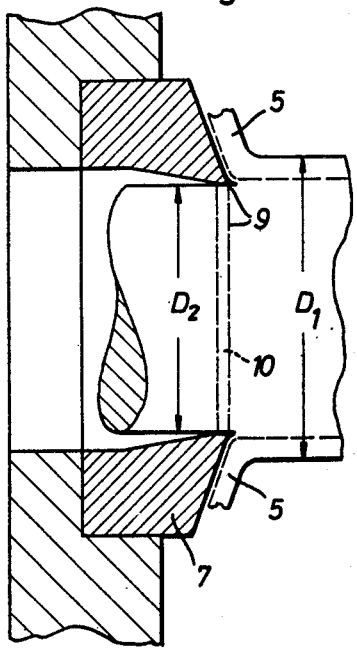
FIGURE 3 shows a cross section of an annular cutting die which is made of high-speed steel while cutting a workpiece.
Figure 4:
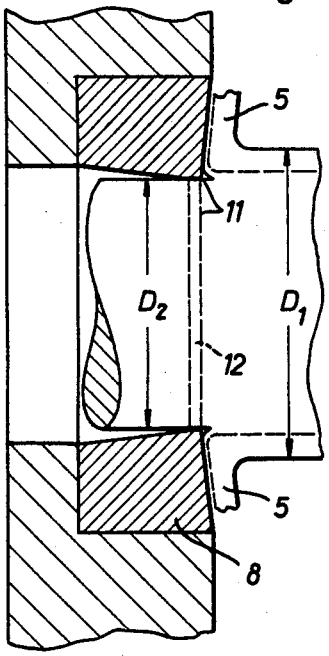
FIGURE 4 shows a cross section of a similar cutting die which is made of cemented carbide, while cutting a workpiece.

The cutting die 7 according to FIGURE 3, which is made of high-speed steel, has a cutting angle of less than 90° and a positive rake angle. Behind the continuous cutting edge 9 a narrow annular surface is provided with a clearance angle of 0°. The annular die 8 according to FIGURE 4, which is made of cemented carbide has a cutting angle of approximately 90°, while the rake angle is negative and amounts, for example, to 5 to 10°. Also, in this case, there is a narrow surface 12 provided behind the cutting edge 11 and with a clearance angle of 0°.

Figure 5:
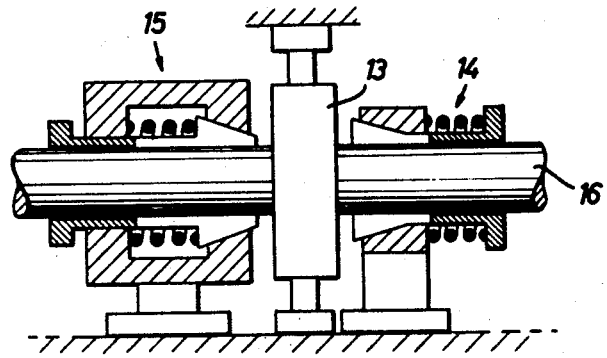
FIGURE 5 shows a side view of a cutting die together with a resilient collet immediately in front of and behind the die.

Each cutting die 7 or 8, which is indicated in FIGURE 5 by the reference numeral 13, should be associated with resilient guide elements, for example, collets or the like 14 and 15. These collets of which two different types are shown in FIGURE 5, are mounted in front of and behind cutting die 13 and are spaced at relatively small distances therefrom. In the particular embodiment as illustrated in FIGURE 5, not only the cutting die 13, but also the resilient guide elements 14 and 15 are made substantially stationary. The workpiece 16 is to be rammed longitudinally through the cutting die 13.

Another possibility of carrying out the invention consists in providing suitable clamping means which are applied upon the workpiece prior to the machining operation and are removed therefrom not until the workpiece has been completely machined, except for the short period during which each clamping means is opened to permit the particular part of the workpiece where this clamping means is located to pass through the cutting die and possibly through one or more resilient guide elements, and possibly also through one or more drawing dies behind the cutting die.

Figure 6:
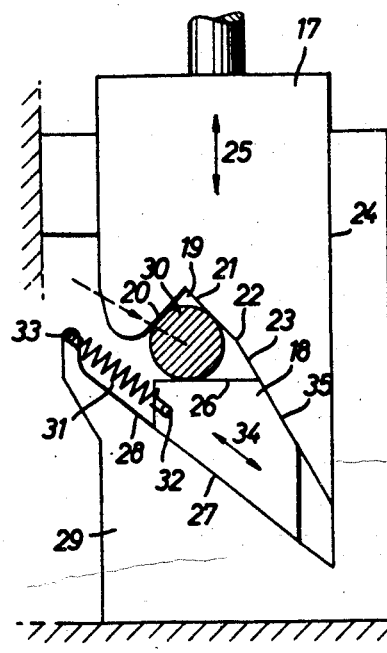
FIGURE 6 shows a side view of a chucking device which is movable together with the workpiece.
Figure 8:
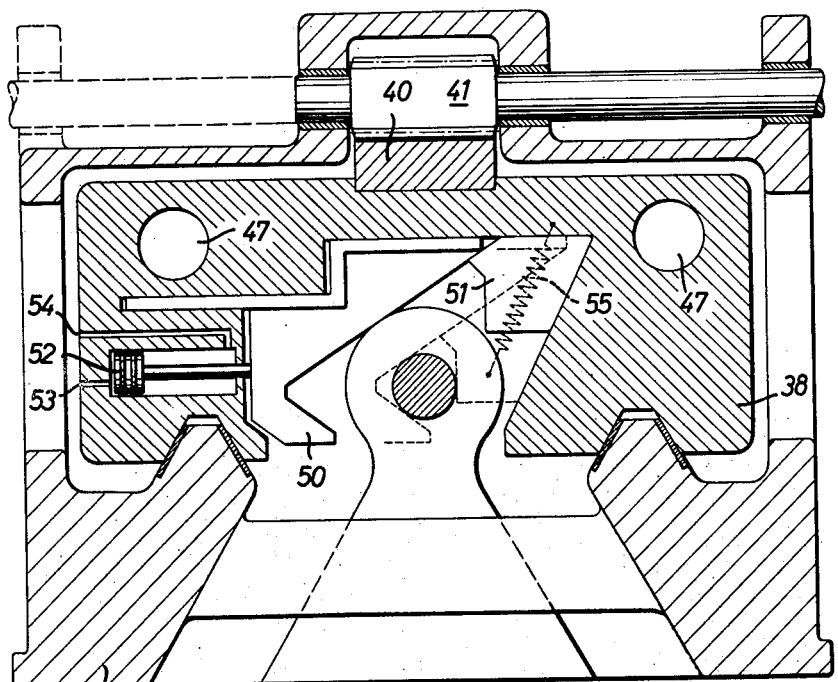
FIGURE 8 shows an enlarged cross section taken along line VIII—VIII of FIGURE 7.

The clamping means to be used preferably form chucking devices of a construction as diagrammatically illustrated in FIGURES 6 and 8. The chucking device according to FIGURE 6 primarily consists of clamping jaws 17 and 18. Clamping jaw 17 is provided with a symmetrical prismatic recess 19, the surfaces 20 and 21 of which extend at an angle of 90° to each other. Surface 21 extends up to a line 22 and then merges into a surface 23 which intersects with a surface 24 which serves for guiding the clamping jaw 17. The other clamping jaw 18 has a clamping surface 26 which extends transversely to the direction of movement of clamping jaw 17, as indicated by the arrow 25, and further it has a surface 27 which extends at an oblique angle to the direction of movement of clamping jaw 17 and rests on a surface 28 which extends parallel to surface 27 on a fixed part 29. This part 29 and the part containing the surface 24 may together form an integral unit, as indicated in FIGURE 6.

Figure 7:
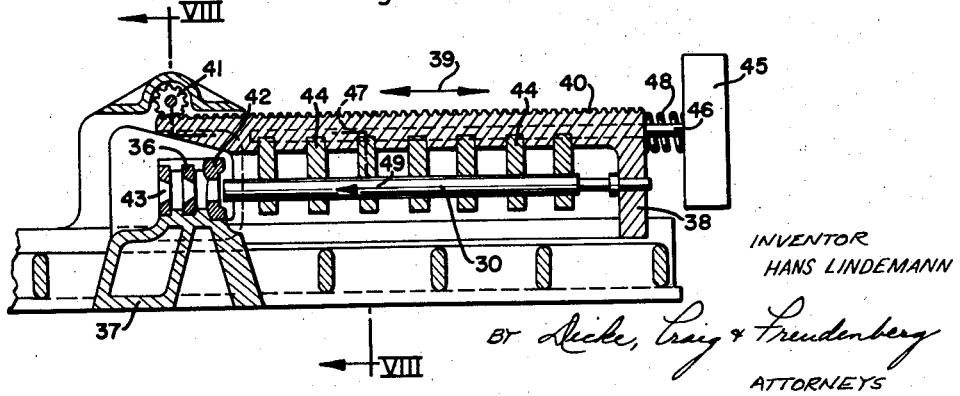

If a bar 30 or the like is to be secured in a fixed position by the clamping jaws 17 and 18, jaw 17 is moved in the direction toward bar 30 which is inserted from one side. Since clamping jaw 18 would not be moved by jaw 17 when acted upon by the latter because of the particular angles at which the different surfaces are inclined to each other, a spring 31 is provided which is connected at one end to jaw 18 at 32 and at the other end to a fixed point at 33, for example, on part 29. Jaw 18 is therefore moved by spring 31 in the direction of arrow 34 and it reverses its direction of movement when bar 30 engages with surface 26 of jaw 18, at which time surfaces 27 and 28 and surfaces 23 and 35, respectively, slide along each other. Independently of the diameter which bar 30 or the like might have, the bar will always be clamped so that its axis will extend in the same direction as the axis which is determined by the axis of cutting die 36 which is mounted in the machine as shown in FIGURES 7 and 8. This machine has a frame 37 which carries a slide carriage 38 which is movable back and forth in the direction as shown by the arrow 39 by means of a pinion 41 which engages with a rack 40 and is driven by a motor, not shown, which is preferably reversible. Frame 37 further supports at least the cutting die 36 which is rigidly secured thereto, although preferably in a manner so as to be removable therefrom so as to permit the die to be exchanged. In the particular embodiment of the invention as illustrated, it is further assumed that a resilient guide element 42 is also mounted on the machine frame 37 in front of cutting die 36, and a drawing die 43 behind the cutting die. The resilient guide element 42 may consist of a collet similar to collet 14 as shown in FIGURE 5.

For rigidly securing a workpiece 30 to slide carriage 38, a plurality of chucking devices 44 similar to the chucking device according to FIGURE 6 are secured to carriage 38. Furthermore, in order to suppress longitudinal vibrations occurring in slide carriage 38, a weight member 45 is provided on the carriage by being mounted on rods 46 which are slidable in bores 47 in carriage 38 and carry springs 48 which connect carriage 38 and weight 45 to each other.

If carriage 38 and thus also the workpiece 30 are moved in the direction of arrow 49, the first chucking device 44 will be opened shortly before it reaches the resilient guide element 42, and it will be opened to such an extent that between clamping jaws 50 and 51, as shown in FIGURE 8, a free space will remain which is slightly larger than the space which is taken up by parts 36, 42, and 43 and the mounting means thereof. Depending upon the distance between two adjacent chucking devices 44, it may then occur that the next chucking device 44 might also have to be opened before the first-opened chucking device will again close behind drawing die 43 so as to grip again the bar which has already been partly machined. In the particular embodiment as illustrated in FIGURES 7 and 8, the opening and closing movement of each clamping jaw 50 is hydraulically controlled, as indicated by the piston 52 and the conduits 53 and 54, whereas the retraction of each clamping jaw 51 is effected by a spring 55 which corresponds to spring 31 in the embodiment according to FIGURE 6. In this manner, each chucking device 44 will be opened shortly before reaching guide element 42 and it will again be closed shortly behind drawing die 43.

Although the invention has been described with reference to the machining of a rod or bar, such machining is by no means limited to rod stock of a circular cross section, such as wires, pipes, shafts, or the like, but it may also be carried out on bars or rods of a square, hexagonal or other cross section. Thus, for example, it is possible according to the invention to machine bars which come out of a rolling mill with a cross-sectional shape similar to that of a gear. After being machined in the same manner as previously described, these bars only need to be cut transversely to a width corresponding to that of the desired gears.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A machine for reducing the cross-sectional thickness of rod stock and similar elongated workpieces comprising a frame, at least one cutting die removably secured to said frame, means including a slide carriage for supporting said workpiece and for ramming said workpiece through said cutting die, means for increasing the natural frequency of said workpiece to counteract longitudinal vibrations thereof comprising guide elements mounted in a substantially stationary position on said frame immediately in front of and immediately behind said cutting die, said slide carriage comprising a plurality of means longitudinally spaced from said guide elements for securing said workpiece against buckling, and means for reciprocating said carriage.

2. A machine for reducing the cross-sectional thickness of rod stock and similar elongated workpieces comprising a frame, at least one cutting die removably secured to said frame, means including a slide carriage for supporting said workpiece and for ramming said workpiece through said cutting die, means for increasing the natural frequency of said workpiece to counteract longitudinal vibrations thereof comprising guide elements mounted in a substantially stationary position on said frame immediately in front of and immediately behind said cutting die, means for reciprocating said slide carriage, and a plurality of clamping means spaced from each other secured to said slide carriage and adapted to grip said workpiece, each of said clamping means being movable by said carriage past said cutting die during the ramming of said workpiece, and means for opening each said clamping means prior to movement thereof past said cutting die and for closing each said clamping means suubsequent to said movement.

3. A machine as defined in claim 2, further comprising at least one weight member slidable relative to said slide carriage and adapted to counteract vibrations of said slide carriage, and at least one spring connecting said weight member with said slide carriage.

4. A machine as defined in claim 2, in which said plurality of clamping means includes parts engaging said workpiece and spaced from each other at a distance smaller than the buckling length of said workpiece.

5. A machine as defined in claim 2, in which each of said clamping means comprises two clamping jaws, means for slidably mounting and guiding said jaws, means for moving said jaws relative to each other, the first of said jaws being slidable in a straight direction and having two plane clamping surfaces extending symmetrically to their direction of movement so as to form a V-shape, the second jaw having a plane clamping surface extending at a right angle to said direction of movement of said first jaw, a fixed supporting surface extending at an oblique angle to said direction of movement of said first jaw, said second jaw having a gliding surface for permitting said jaw to slide in a straight direction along said fixed oblique surface, at least one spring acting upon said second jaw to move the same in a direction toward said first jaw, said second jaw having a straight contact surface opposite to said gliding surface and extending at an acute angle thereto, said first jaw having a projecting part with a surface thereon having an angularity corresponding to that of said contact surface of said second jaw, said contact surface of said second jaw engaging with said corresponding surface of said first jaw when a workpiece is clamped between said clamping surfaces of said two jaws.

6. A machine as defined in claim 5, in which said means for moving said jaws relative to each other comprise hydraulic means adapted to act upon said first clamping jaw of each clamping means for moving said jaw back and forth.

References Cited in the file of this patent

UNITED STATES PATENTS

| 1,361,568 | Donaldson | Dec. 7, 1920 |
| 2,009,670 | Morton | July 30, 1935 |
| 2,233,928 | Weaver | Mar. 4, 1941 |
| 2,679,680 | Hanks | June 1, 1954 |

FOREIGN PATENTS

| 745,547 | Great Britain | Feb. 29, 1956 |
| 562,016 | Canada | Aug. 19, 1958 |